(12) United States Patent
Kerth

(10) Patent No.: US 10,775,111 B2
(45) Date of Patent: Sep. 15, 2020

(54) PUMPED HEAT ENERGY STORAGE SYSTEM WITH CONVEYABLE SOLID THERMAL STORAGE MEDIA DIRECTLY THERMALLY COUPLED TO WORKING FLUID

(71) Applicant: Dresser-Rand Company, Olean, NY (US)

(72) Inventor: Jason M. Kerth, Houston, TX (US)

(73) Assignee: DRESSER-RAND COMPANY, Olean, NY (US)

( * ) Notice: Subject to any disclaimer, the term of this patent is extended or adjusted under 35 U.S.C. 154(b) by 83 days.

(21) Appl. No.: 16/204,223

(22) Filed: Nov. 29, 2018

(65) Prior Publication Data

US 2019/0162482 A1    May 30, 2019

Related U.S. Application Data

(60) Provisional application No. 62/591,795, filed on Nov. 29, 2017.

(51) Int. Cl.
*F24D 11/00* (2006.01)
*F28D 20/00* (2006.01)
(Continued)

(52) U.S. Cl.
CPC .......... *F28D 20/0056* (2013.01); *F01K 3/12* (2013.01); *F28C 3/14* (2013.01); *F28D 2020/0082* (2013.01)

(58) Field of Classification Search
CPC ......... F28D 20/0056; F28D 2020/0082; F01K 3/12; F28C 3/14
(Continued)

(56) References Cited

U.S. PATENT DOCUMENTS 10,082,045 B2    9/2018  Larochelle et al.
10,082,104 B2    9/2018  Apte
(Continued)

OTHER PUBLICATIONS

Boura, Cristiano Teixeira et al., "Development of Heat Exchanger for High Temperature Energy Storage with Bulk Materials", AIP Conference Proceedings, American Institute of Physics, 2016, 8 pages.
(Continued)

*Primary Examiner* — Davis D Hwu

(57) ABSTRACT

A pumped heat energy storage system (11) is provided. A thermodynamic charging assembly (11') may be configured to compress a working fluid and generate thermal energy. A thermal storage assembly (32) is coupled to charging assembly to store at atmospheric pressure by way of a conveyable bulk solid thermal storage media thermal energy generated by the charging assembly. A thermodynamic discharging assembly (11") is coupled to the thermal storage assembly to extract thermal energy from the thermal storage assembly and convert extracted thermal energy to electrical energy. A heat exchanger assembly (34) is coupled to the thermal storage assembly. The heat exchanger assembly is arranged to directly thermally couple the conveyable bulk solid thermal storage media that is conveyed to the heat exchanger assembly with a flow of the working fluid that passes through the heat exchanger assembly. Disclosed embodiments can make use of immersed-particle heat exchanger technology and can offer similar roundtrip efficiency and pressure ratio characteristics comparable to those of a recuperated cycle without involving a recuperator and concomitant piping.

20 Claims, 9 Drawing Sheets

(51) Int. Cl.
*F01K 3/12* (2006.01)
*F28C 3/14* (2006.01)

(58) Field of Classification Search
USPC ........................................................ 165/236
See application file for complete search history.

(56) References Cited

U.S. PATENT DOCUMENTS

| | | | |
|---|---|---|---|
| 2010/0147604 A1* | 6/2010 | Sakita | B60K 1/04 |
| | | | 180/65.1 |
| 2015/0159959 A1 | 6/2015 | Petrovic | |
| 2015/0260463 A1 | 9/2015 | Laughlin et al. | |
| 2016/0072291 A1* | 3/2016 | Goldman | H02J 3/381 |
| | | | 700/295 |
| 2016/0108761 A1* | 4/2016 | Frazier | F28D 20/026 |
| | | | 60/659 |
| 2017/0350658 A1 | 12/2017 | Kerth et al. | |
| 2018/0142577 A1* | 5/2018 | Ortmann | F01K 25/005 |

OTHER PUBLICATIONS

Warerkar, Shashikant et al., "Air-Sand Heat Exchanger for High-Temperature Storage", Journal of Solar Energy Engineering, vol. 133, May 2011, ASME, 7 pages.
Mehos, Greg, "Bulk Solids: Operating Direct-Contact Heat Exchangers", Chemical Engineering, www.chemengonline.com, Nov. 2014, 7 pages.
Ratuszny, Pawel, "Thermal energy storage in granular deposits", E3S Web of Conferences 19, http://creativecommons.org/licenses/by/4.0/, EDP Sciences, 2017, 6 pages.
Amirante, R. et al, "High Temperature Gas-to-Gas Heat Exchanger Based on a Solid Intermediate Medium", Advances in Mechanical Engineering, vol. 2014, Department of Mechanical Engineering and Management, Polytechnic of Bari, Apr. 15, 2014, Bari, Italy, 20 pages.
Mctigue, Joshua, "Analysis and Optimisation of Thermal Energy Storage", St. Catharine's College, Cambridge University Engineering Department, Sep. 29, 2016, 291 pages.
Dietrich, Axel, "Assessment of Pumped Heat Electricity Storage Systems through Exergoeconomic Analyses", Technische Universitat Darmstadt, Aug. 21, 2017, Darmstadt, Germany, 145 pages.
Desrues, Tristan, "Stockage massif d'electricite sous forme thermique", Universite de Grenoble, Sep. 27, 2011, France, 201 pages.

* cited by examiner

PUMPED HEAT ENERGY STORAGE SYSTEM WITH CONVEYABLE SOLID THERMAL STORAGE MEDIA DIRECTLY THERMALLY COUPLED TO WORKING FLUID

This application claims benefit of the Nov. 29, 2017 filing date of U.S. provisional application 62/591,795, which is incorporated by reference herein.

BACKGROUND

1. Field

Disclosed embodiments relate generally to the field of pumped heat energy storage (PHES) systems, and, more particularly, to PHES systems involving conveyable solid thermal storage media directly thermally coupled to the working fluid.

2. Description of the Related Art

PHES systems store excess electrical power in the form of thermal energy during periods of excess electrical generation that, for example, may be available in an electrical grid. Conversely, during periods of high demand of electricity, PHES systems use the stored thermal energy to generate electricity, which is transferable to the electrical grid to meet the high demand. In the PHES system, a motor may utilize electrical energy to drive a heat pump cycle during a charging cycle. The heat pump cycle effectively moves thermal energy from a cold reservoir to a hot reservoir to store the thermal energy. When desired, a heat engine cycle may be utilized to extract and convert the stored thermal energy to produce mechanical energy, which may be utilized to generate electricity. For an example of a PHES system involving conveyable solid thermal storage media, which is indirectly thermally coupled to the working fluid; see U.S. patent application Ser. No. 15/904,796, which is herein incorporated by reference.

DETAILED DESCRIPTION

Figure 1:
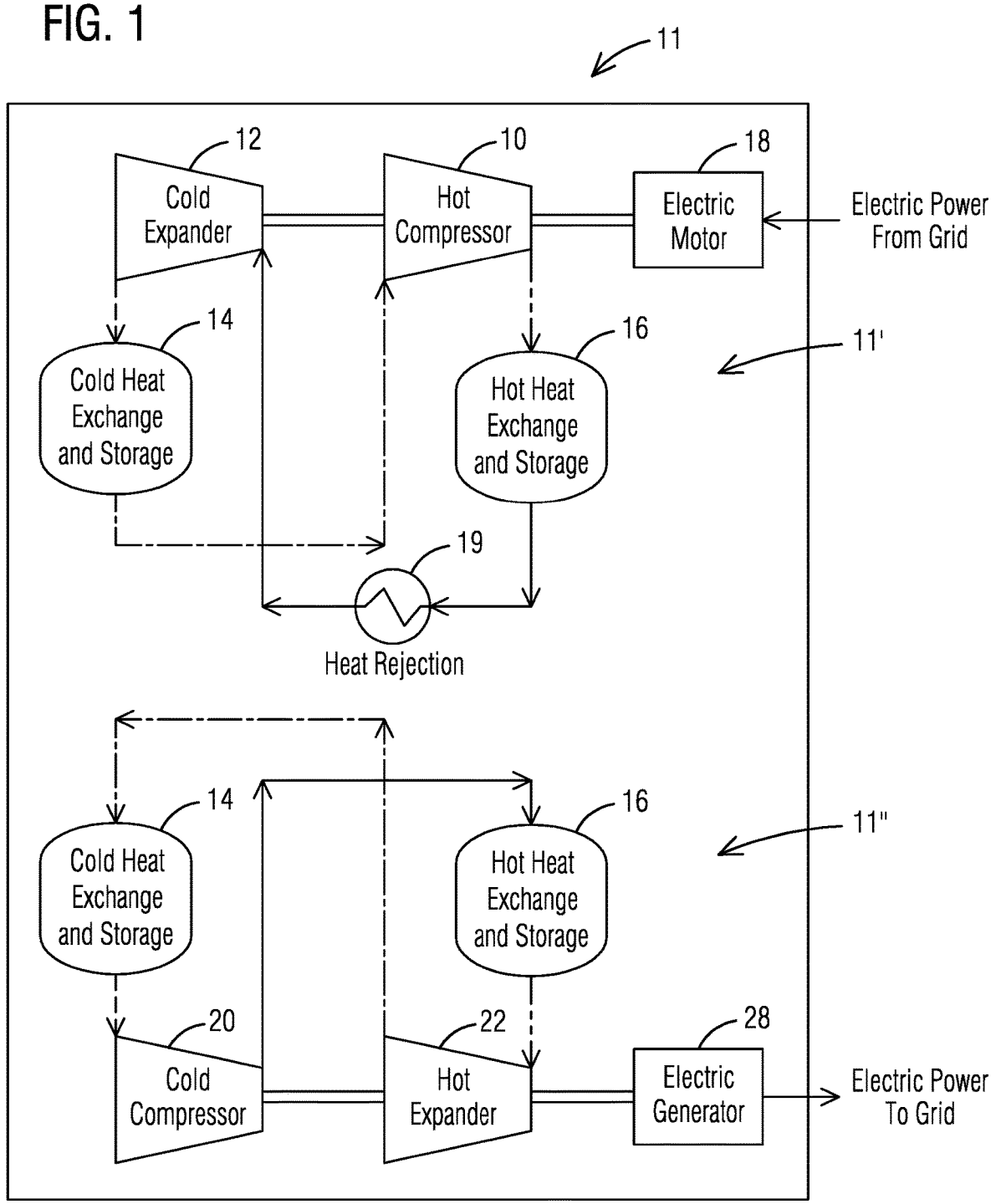
FIG. 1 is a flow diagram of an idealized overlapped cycle as may be used in a disclosed PHES system involving conveyable, solid thermal storage media directly thermally coupled to a working fluid.

Disclosed embodiments are directed to a PHES system involving conveyable solid thermal storage media, which is directly thermally coupled to the working fluid. Without limitation, disclosed embodiments can make use of immersed-particle heat exchanger technology (this type of exchangers may also be referred to in the art as falling-bed heat exchangers).

The present inventor has recognized that the cost of traditional heat exchangers typically involved in certain prior art PHES systems (e.g., operable with liquid thermal store media, such as molten salt), may be relatively high because of bulky metal structures that may be required to bring two or more distinct fluids into close enough proximity over a large enough surface area so as to effect appropriate heat transfer from one fluid to the other/s while still maintaining an appropriate pressure boundary which prevents the fluids from mixing with one another.

Disclosed embodiments do without heat exchangers involving such bulky metal structures since the heat transfer is achieved directly between the working fluid and the conveyable solid thermal storage media. The pressure containment involved in prior art heat exchangers is not needed because there is no tendency for the solid media to transfer mass to a vapor phase towards an equilibrium saturation condition (as is the case when a liquid with some positive vapor pressure is in direct contact with a gas). Additionally, in disclosed embodiments since the working fluid is not contained within relatively narrow tubes or other similar structures, it is expected that the pressure drop through disclosed PHES systems should be relatively low, and thus leading to further improvements in cycle efficiency.

In the following detailed description, various specific details are set forth in order to provide a thorough understanding of such embodiments. However, those skilled in the art will understand that disclosed embodiments may be practiced without these specific details that the aspects of the present invention are not limited to the disclosed embodiments, and that aspects of the present invention may be practiced in a variety of alternative embodiments. In other instances, methods, procedures, and components, which would be well-understood by one skilled in the art have not been described in detail to avoid unnecessary and burdensome explanation.

Furthermore, various operations may be described as multiple discrete steps performed in a manner that is helpful for understanding embodiments of the present invention. However, the order of description should not be construed as to imply that these operations need be performed in the order they are presented, nor that they are even order dependent, unless otherwise indicated. Moreover, repeated usage of the phrase "in one embodiment" does not necessarily refer to the same embodiment, although it may. It is noted that disclosed embodiments need not be construed as mutually exclusive embodiments, since aspects of such disclosed embodiments may be appropriately combined by one skilled in the art depending on the needs of a given application.

FIG. 1 is a flow diagram regarding a PHES thermodynamic cycle as may be arranged in a disclosed PHES system 11 involving conveyable solid thermal storage media, which is directly thermally coupled to a working fluid, such as without limitation air. In certain embodiments, PHES system 11 may be configured to perform an overlapped cycle. That is, the PHES thermodynamic cycle constitutes an overlapped cycle. Noticeable in FIG. 1 is the absence of a recuperator, and this design characteristic is discussed in greater detail below. As will be appreciated by one skilled in the art, a recuperator is a physical heat exchanger that may be arranged in certain PHES systems to transfer thermal energy between a high-pressure and a low-pressure working fluid.

As can be appreciated in FIG. 1, in a thermodynamic charging assembly 11' of PHES system 11, turbomachinery—such as comprising a hot compressor 10 and a cold expander 12—is arranged to move thermal energy from a cold heat exchange and thermal storage apparatus 14 towards a hot heat exchange and storage apparatus 16. That is, during the charging portion of the cycle performed by thermodynamic charging assembly 11', the system operates as a heat pump using work produced, for example, by an electric motor 18 powered with electrical power available from an electric grid to effectively move heat against its natural gradient from a cooler region to a hotter region and store the available energy in the form of heat.

Since a PHES cycle, like any real-world thermodynamic system, involves irreversible energy losses or dissipation the system involves a heat exchanger 19 arranged to reject such energy losses or dissipation. Absence of heat rejection would imply a perpetual motion machine, which is a physical impossibility. Although FIG. 1 illustrates the heat rejection located in the charging portion of the cycle, it will be appreciated that the heat rejection could be located in the discharging portion of the cycle, or, alternatively, could be located both in the charging portion of the cycle and in the discharging portion of the cycle.

As can be further appreciated in FIG. 1, in a thermodynamic discharging assembly 11" of PHES system 11, further turbomachinery—such as comprising a cold compressor 20 and a hot expander 22—is arranged to move thermal energy from hot heat exchange storage apparatus 16 towards cold heat exchange storage apparatus 14. That is, during the discharging portion of the cycle, the system operates as a heat engine where work can be extracted to, for example, drive an electric generator 28 and generate electrical energy. Non-limiting structural details regarding cold heat exchange and thermal storage apparatus 14 and hot heat exchange and storage apparatus 16 are provided below.

The inventor has recognized that given a thermal storage media with a wide operable temperature range (such as many practical conveyable bulk solid materials can effectively provide), the overlapped cycle offers similar roundtrip efficiency and pressure ratio characteristics as a recuperated cycle but does not require the recuperator and concomitant piping. The inventor has further recognized that many conveyable solid materials can offer lower cost per unit energy storage compared to liquid candidates, such as molten salt for hot stores and hydrocarbons or glycols for cold stores.

Non-limiting examples of conveyable solid thermal storage media may include conveyable bulk solid thermal storage media comprising granular materials, such as sand; rock bulk materials, including those of volcanic origin, such as basalt rock, diabase rock, granite rock and gneiss rock; ball bulk material such as single-grain bulk material such as a comprising spheroids of approximately the same diameter or multi-grain bulk material comprising spheroids of different diameters. In certain embodiments, the bulk solid thermal storage media may be or include a metallic material (e.g., metal filings, metal shots, etc.), metal oxides, such as hematite (iron oxide) and alumina (aluminum oxide) and/or a ceramic material. In general, thermal storage in metals can lead to high storage density, e.g., small storage volume, but at a relatively higher cost. Without limitation, certain metal oxides can offer medium storage density and medium cost while natural materials can offer lowest storage density e.g., relatively large storage volume but lowest cost. In current state of the art, the value added by reduction of storage volume would not justify the incremental costs, and therefore, presently, the low-cost/high volume approach is likely to be preferred from an economics point of view. It should be understood that this present point of view should not be construed in a limiting sense.

In still other embodiments, the conveyable bulk solid thermal storage media may be in the form of packed beds, such as without limitation may include spherical and/or irregularly shaped pebbles, gravel, or some other structures defining interstices through which the working fluid passes.

Figure 2:
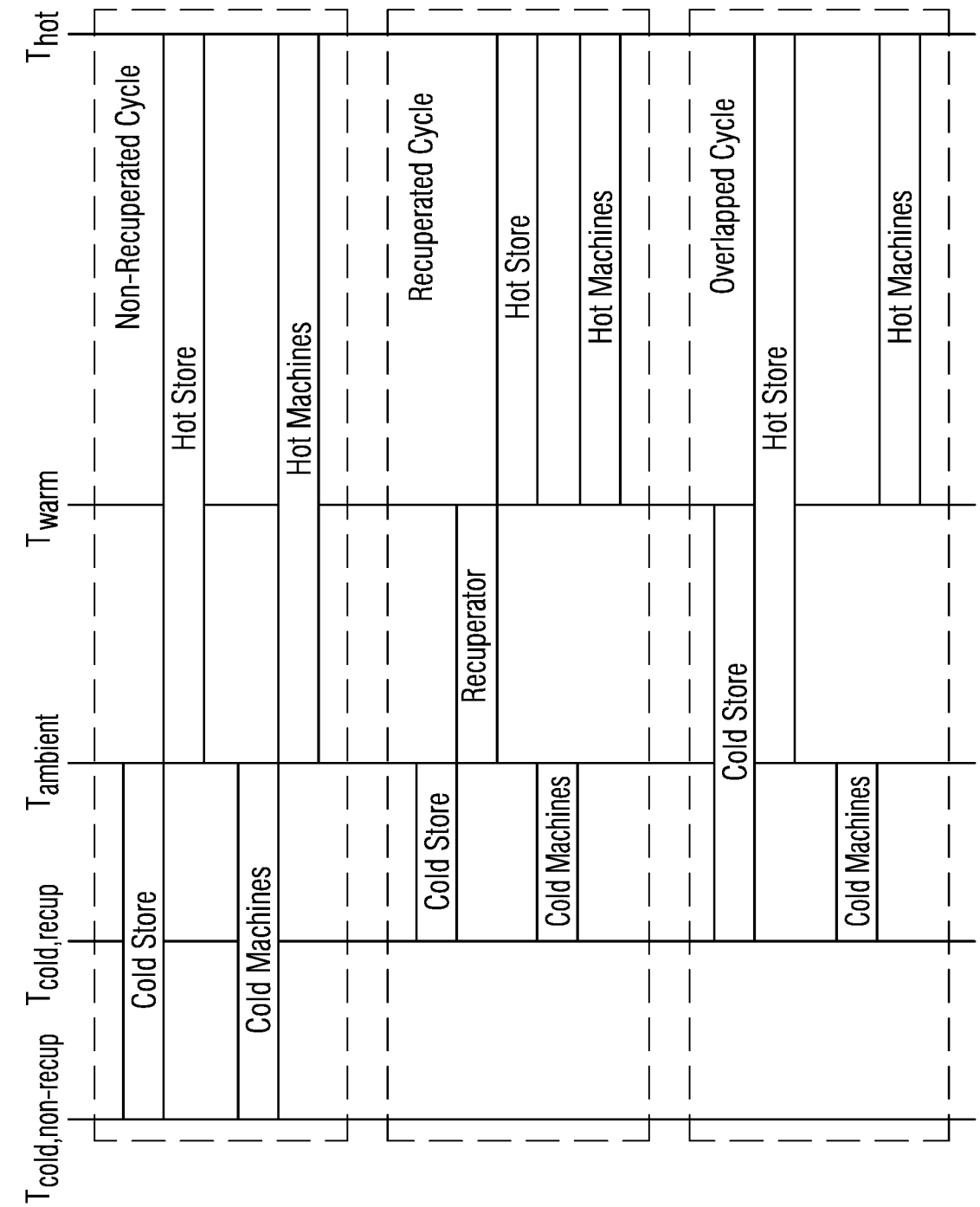
FIG. 2 is a visual tabulation of non-limiting temperature ranges that may be associated with various cycles that may be involved in a generic PHES system including a disclosed PHES system configured with the overlapped cycle; this visual tabulation may be useful for conceptually interrelating the temperature ranges associated with the various PHES cycles.

As may be appreciated in FIG. 2, in the overlapped cycle the cold-temperature heat exchange process (labeled Cold Store) can be extended to a temperature (labeled Twarm) comparable to the recuperator hot-end temperature while the hot-temperature heat exchange process (labeled Hot Store) can be extended to a temperature (labeled Tambient) comparable to the recuperator cold-end temperature. As such, in the overlapped cycle the operable temperature ranges of the respective hot and cold stores overlap and thus the designation "overlapped cycle". This temperature overlap allows reducing the temperature range to which the respective hot and cold turbomachinery are subject to, and this in turn allows reducing the pressure ratio involved in the overlapped cycle, resulting in various benefits to the system and cost reduction based on the elimination of recuperator and concomitant piping. It will be appreciated that in certain applications—such as may involve balancing tradeoffs of efficiency versus costs—disclosed PHES systems may be implemented using the recuperated cycle or a non-recuperated cycle in lieu of the overlapped cycle.

The description below will proceed to describe various non-limiting embodiments for conveying the conveyable solid thermal storage media in disclosed PHES systems where the conveyable solid thermal storage media is directly thermally coupled to the working fluid. Elements having the same reference alphanumeric (or label) as illustrated in a previous figure, unless otherwise stated, provide the same functionality and will not be discussed again to avoid redundant description.

Figure 3:
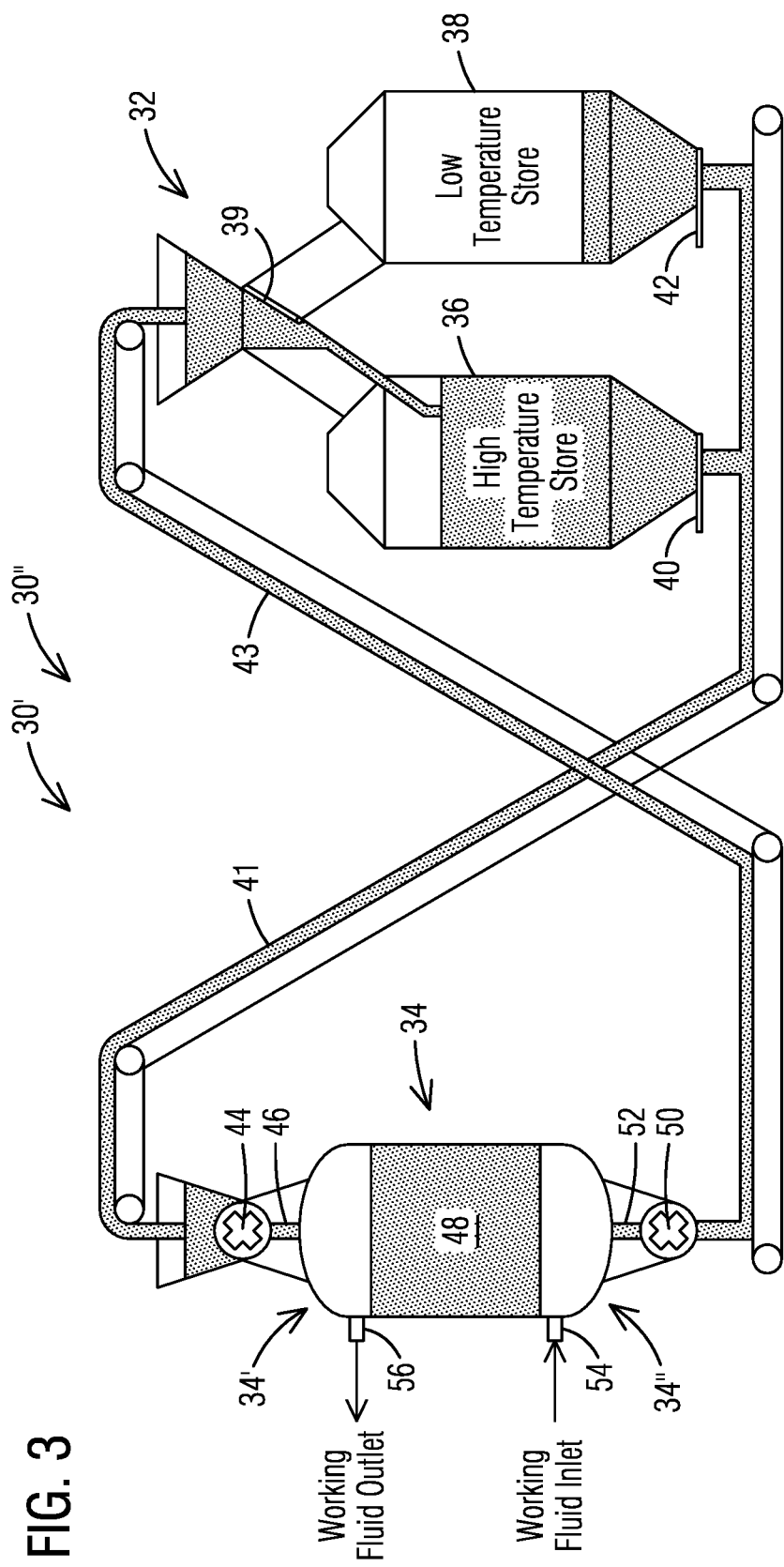
FIG. 3 is a schematic of one non-limiting embodiment of a disclosed apparatus involving a continuous feeder assembly for implementing the direct thermal coupling between the conveyable solid thermal storage media and a working fluid in a disclosed PHES system.

FIG. 3 is a schematic of structural details of an apparatus 30' that may constitute one non-limiting embodiment of cold heat exchange storage apparatus 14 (FIG. 1). Similarly, apparatus 30" (same as apparatus 30') may constitute one non-limiting embodiment of hot heat exchange storage apparatus 16. Accordingly, to spare the reader from burdensome redundancies, the description of apparatuses 30' and 30" will not be repeated twice. Without limitation, apparatus 30' (30") involve a continuous feeder assembly arranged to circulate conveyable solid thermal storage media between a thermal storage assembly 32 and a heat exchanger assembly 34.

Without limitation, as would be appreciated by one skilled in the art, an entire disclosed PHES system would include at least four store tanks and at least two direct contact heat exchange vessels: a Low Temp tank and High Temp tank arranged to interact with one of the heat exchange vessels for the Cold Store. Additionally, a Low Temp tank and High Temp tank arranged to interact with the other one of the heat exchange vessels for the Hot Store.

Without limitation, thermal storage assembly 32 may include a high-temperature store 36 and a low-temperature store 38, each operable at atmospheric condition. High-temperature store 36 and low-temperature store 38 may be interconnected to a solid media diverter inlet valve 39 arranged to selectively direct conveyable solid thermal storage media received from heat exchanger assembly 34 by way of conveyor 43 either to high-temperature store 36 or to low-temperature store 38.

High-temperature store 36 may be connected to a solid media outlet valve 40 and low-temperature store 38 may be connected to a solid media outlet valve 42 to selectively transfer conveyable solid thermal storage media either from high-temperature store 36 or from low-temperature store 38 to heat exchanger assembly 34 by way of conveyor 41. Without limitation, conveyors 41, 43 may comprise belt conveyors, apron conveyors, air slides, bucket elevators, pneumatic lifters, screw type elevators, or combinations thereof as appropriate.

In one non-limiting embodiment, apparatus 30' (and 30") include a first rotary airlock 44 disposed at or proximate a top end 34' of heat exchanger assembly 34. First rotary airlock 44 may be connected to a solid thermal storage media inlet 46 arranged to pass conveyable bulk solid thermal storage media to a pressurized chamber 48 of heat exchanger assembly 34 from thermal storage assembly 32.

Feeder assembly 30 further includes a second rotary airlock 50 disposed at or proximate a bottom end 34" of heat exchanger assembly 34. Second rotary airlock 50 may be connected to a solid thermal storage media outlet 52 arranged to transfer from pressurized chamber 48 of heat exchanger assembly 34 to thermal storage assembly 32 the solid thermal storage media passed to the heat exchanger assembly 34.

Heat exchanger assembly 34 may be connected to a working fluid inlet 54 disposed at or proximate bottom end 34" of heat exchanger assembly 34, and is further connected to a working fluid outlet 56 disposed at or proximate top end 34' of heat exchanger assembly 34 so that the working fluid flows upwardly (schematically represented by arrow 58 in FIG. 4) between working fluid inlet 54 and working fluid outlet 56 to establish a direct thermal coupling with the conveyable solid thermal storage media that falls downwardly (schematically represented by arrow 60 in FIG. 4) into pressurized chamber 48 of heat exchanger assembly 34 between solid thermal storage media inlet 46 and solid thermal storage media outlet 52.

Non-limiting operational relationships for an overlap cycle would be as follows:

Fully Discharged Condition

Hot HX and Store (16): In apparatus 30": Low Temp Store (38) is full of media @ T_Amb; and High Temp Store (36) is empty.

Cold HX and Store (14): In apparatus 30': High Temp Store (36) is full of media @ T_Warm; and Low Temp Store (38) is empty.

Charging Action

Hot HX and Store (16): In apparatus 30": Media exits from Low Temp Store (38) @ T_Amb, to be heated by working fluid to T_Hot in HX (34), and is sent to High Temp Store (36) @ T_Hot.

Cold HX and Store (14): In apparatus 30': Media exits from High Temp Store (36) @ T_Warm, to be cooled by working fluid to T_Cold in HX (34), and is sent to Low Temp Store (38) @ T_Cold.

Fully Charged Condition

Hot HX and Store (16): In apparatus 30": Low Temp Store (38) is empty; and High Temp Store (36) is full of media @ T_Hot.

Cold HX and Store (14): In apparatus 30': High Temp Store (36) is empty; and Low Temp Store (38) is full of media @ T_Cold.

Discharging Action

Hot HX and Store (16): In apparatus 30": Media exits from High Temp Store (36) @ T_Hot, to be cooled by working fluid to T_Amb in HX (34), and is sent to Low Temp Store (36) @ T_Amb.

Cold HX and Store (14): In apparatus 30": Media exits from Low Temp Store (38) @ T_Cold, to be warmed by working fluid to T_Warm in HX (34), and then is sent to High Temp Store (36) @ T_Warm.

At conclusion of "Discharging Action", the system is back at the initial state of "Fully Discharged Condition", and the process continues as outlined above.

Figure 4:
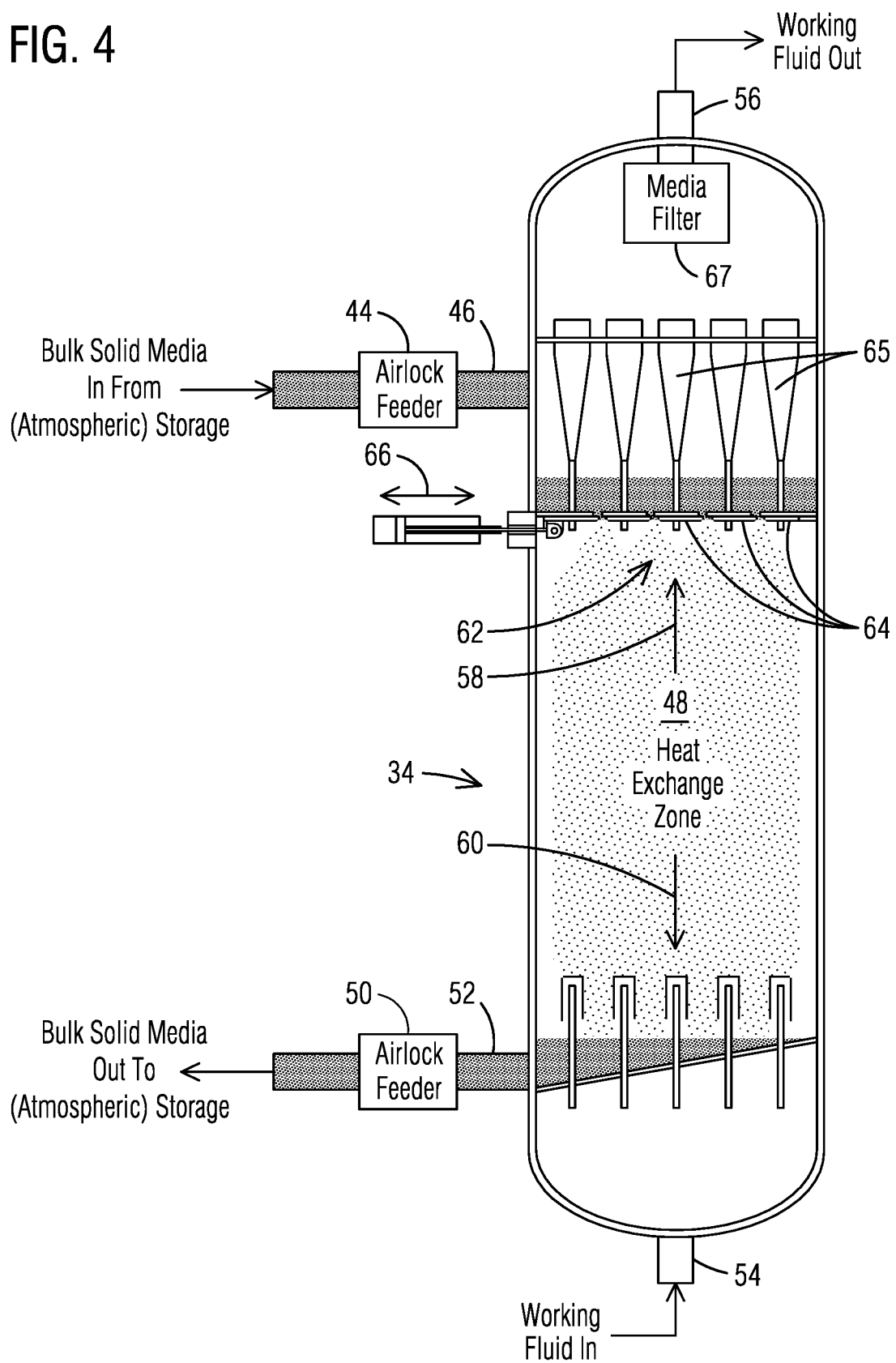
FIG. 4 is a schematic illustrating certain non-limiting structural details of a heat exchanger assembly, as may be arranged in a disclosed PHES system.

FIG. 4 is a schematic illustrating certain non-limiting structural details of heat exchanger assembly 34 as may be arranged in a disclosed PHES system. FIG. 4 illustrates a valve assembly 62 that without limitation may be arranged downstream from and proximate solid thermal storage media inlet 46 to which the first rotary airlock 44 is connected to. Valve assembly 62 may include a plurality of valve plates 64 that may be selectively slidably arranged (as schematically represented by twin headed arrow 66) to control a mass flow rate of the conveyable solid thermal storage media passed to pressurized chamber 48 of heat exchanger assembly 34.

In certain embodiments, heat exchanger assembly 34 may include a plurality of cyclone separators 65 and a media filter 67 to reduce the possibility of particulates of the solid media being expelled from pressurized chamber 48 through working fluid outlet 56 since such particulates could cause harm to turbomachinery that in operation may use the working fluid.

It will be appreciated that first rotary airlock 44 and second rotary airlock 50, as illustrated in FIGS. 3 and 4, are arranged to operate as continuous rotary airlocks so that in operation the feeder assembly continually circulates the conveyable solid thermal storage media between thermal storage assembly 32 and heat exchanger assembly 34.

Figure 5:
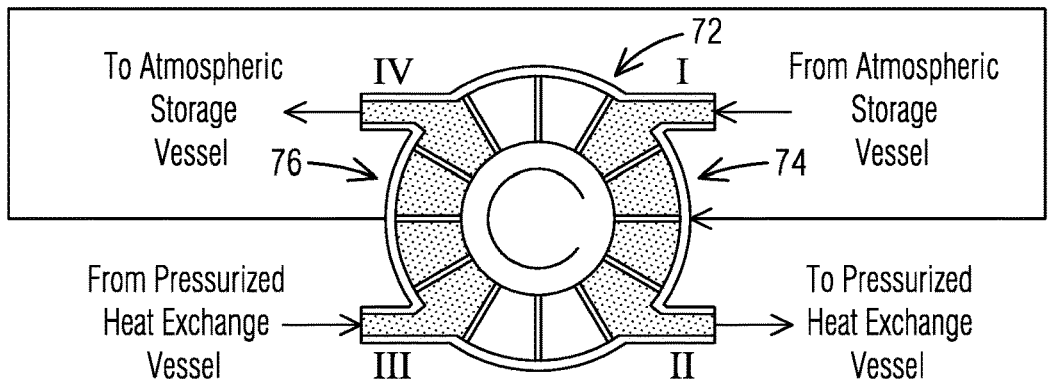
FIG. 5 is a cross-sectional view illustrating one non-limiting embodiment of a disclosed rotary airlock as may be used in the disclosed feeder assembly.
Figure 6:
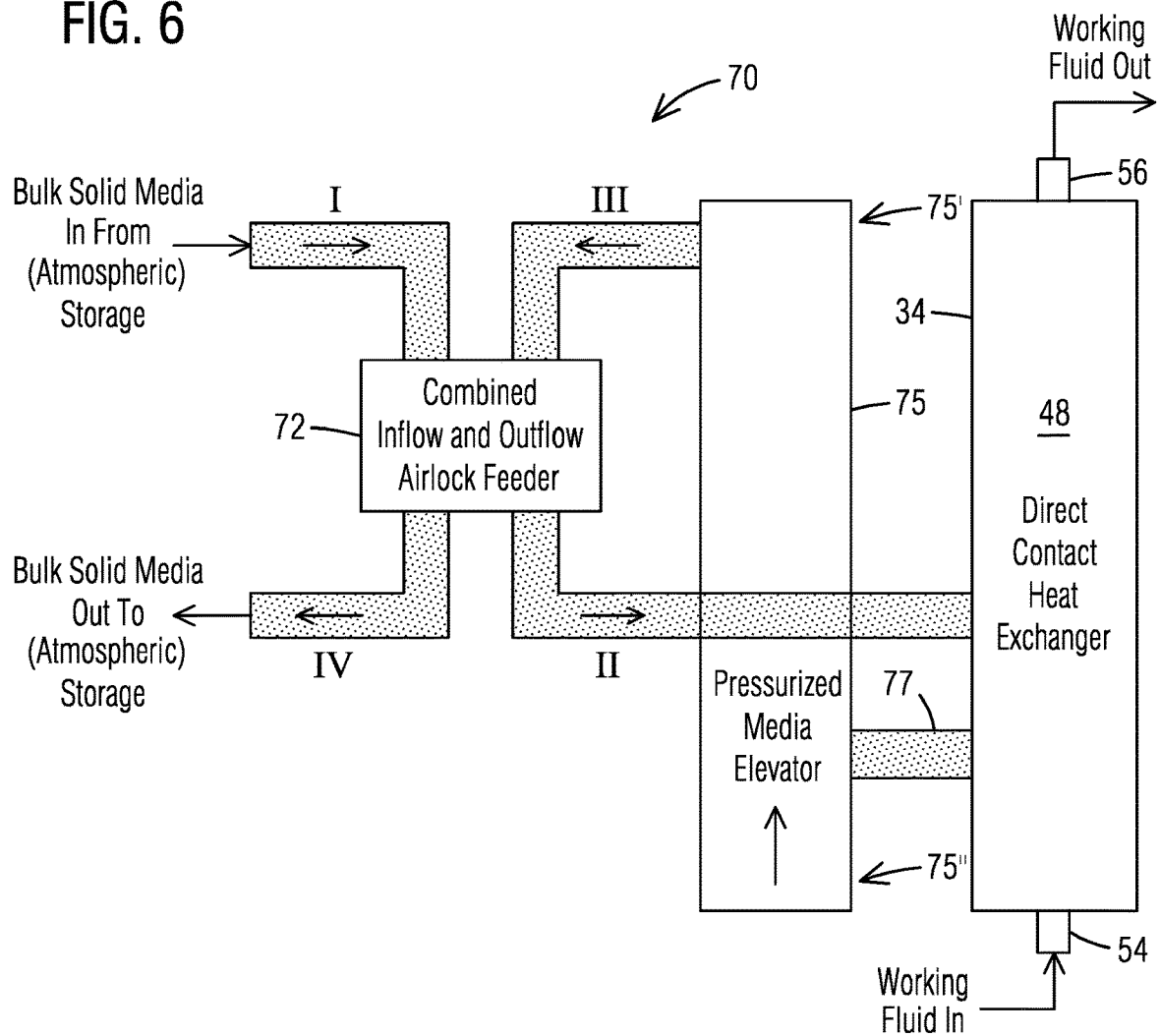
FIG. 6 is a schematic of another non-limiting embodiment of the disclosed feeder assembly, such as may involve the rotary airlock of FIG. 5.

FIG. 6 is a schematic of another non-limiting embodiment of a disclosed feeder assembly 70, such as may involve a disclosed rotary airlock 72. Certain non-limiting structural details of rotary airlock 72 are illustrated in FIG. 5. To facilitate the reader to follow various interconnections provided by rotary airlock 72, respective inlets and outlets of rotary airlock 72 are designated with same roman numerals in FIGS. 5 and 6.

A first solid thermal storage media inlet (I) coupled to a first operating stage 74 of rotary airlock 72 may be fillable with conveyable solid thermal storage media received from solid media storage at atmospheric pressure. Rotary airlock 72 further includes a first solid thermal storage media outlet (II) arranged to supply to pressurized chamber 48 of heat exchanger assembly 34 conveyable solid thermal storage media from the first operating stage 74 of rotary airlock 72.

Rotary airlock 72 is further connected to a second solid thermal storage media outlet (IV) arranged to return to the thermal storage assembly at atmospheric pressure conveyable solid thermal storage media from a second operating stage 76 of rotary airlock 72 fillable with conveyable solid thermal storage media received from pressurized chamber 48 of heat exchanger assembly 34 by way of a second solid thermal storage media inlet III connected to the second operating stage 76 of rotary airlock 72.

FIG. 6 further illustrates a pressurized solid thermal storage media elevator 75 having a top end 75' and a bottom end 75" that may be arranged to receive through a bottom region connector 77 conveyable bulk solid thermal storage media from a bottom region of pressurized chamber 48 of heat exchanger assembly 34. Top end 75' of pressurized solid thermal storage media elevator 75 may be arranged to convey to second solid thermal storage media inlet III conveyable bulk solid thermal storage media upwardly moved by pressurized solid thermal storage media elevator 75 from bottom end 75" of pressurized solid thermal storage media elevator 75.

As noted above, heat exchanger assembly is connected to working fluid inlet 54 disposed at or proximate the bottom end of heat exchanger assembly 34, and is further connected to working fluid outlet 56 disposed at or proximate the top end of the heat exchanger assembly so that the working fluid flows upwardly between the working fluid inlet and the working fluid outlet to establish a direct thermal coupling with conveyable solid thermal storage media that falls downwardly into the pressurized chamber 48 of heat exchanger assembly 34 between the first solid thermal storage media outlet III and the bottom region of the pressurized chamber of the heat exchanger assembly.

It will be appreciated that the design of rotary airlock 72—which involves a unitary device as opposed to two separate devices—is effective to reduce loss of working fluid compared to a conventional rotary airlock design. For example, in the conventional rotary airlock design, high-pressure working fluid would be trapped in the volume designated as second operational stage in the disclosed rotary airlock 72 and this trapped working fluid would leak and be lost. As should be now appreciated by one skilled in the art, the volume flow of working fluid lost in this manner is approximately equal to the volume flow of solid media which is now fed into the volume designated as second operational stage in the disclosed rotary airlock 72, so that if the pressure of the gas (i.e. density) is high, this volume in a conventional rotary airlock can amount to a significant mass loss of working fluid. By way of comparison, in the disclosed rotary airlock 72, the volume of working fluid is reduced by filling the second operational stage in the disclosed rotary airlock 72 with solid media. In this case, the lost working fluid is limited to the void fraction in the bulk solid media, which in the case of sand is approximately 40% of the bulk volume. It will be appreciated that the location of the operational stages in the disclosed rotary airlock 72 would be reversed if the direction of rotation rotary airlock 72 were to be reversed.

Figure 7:
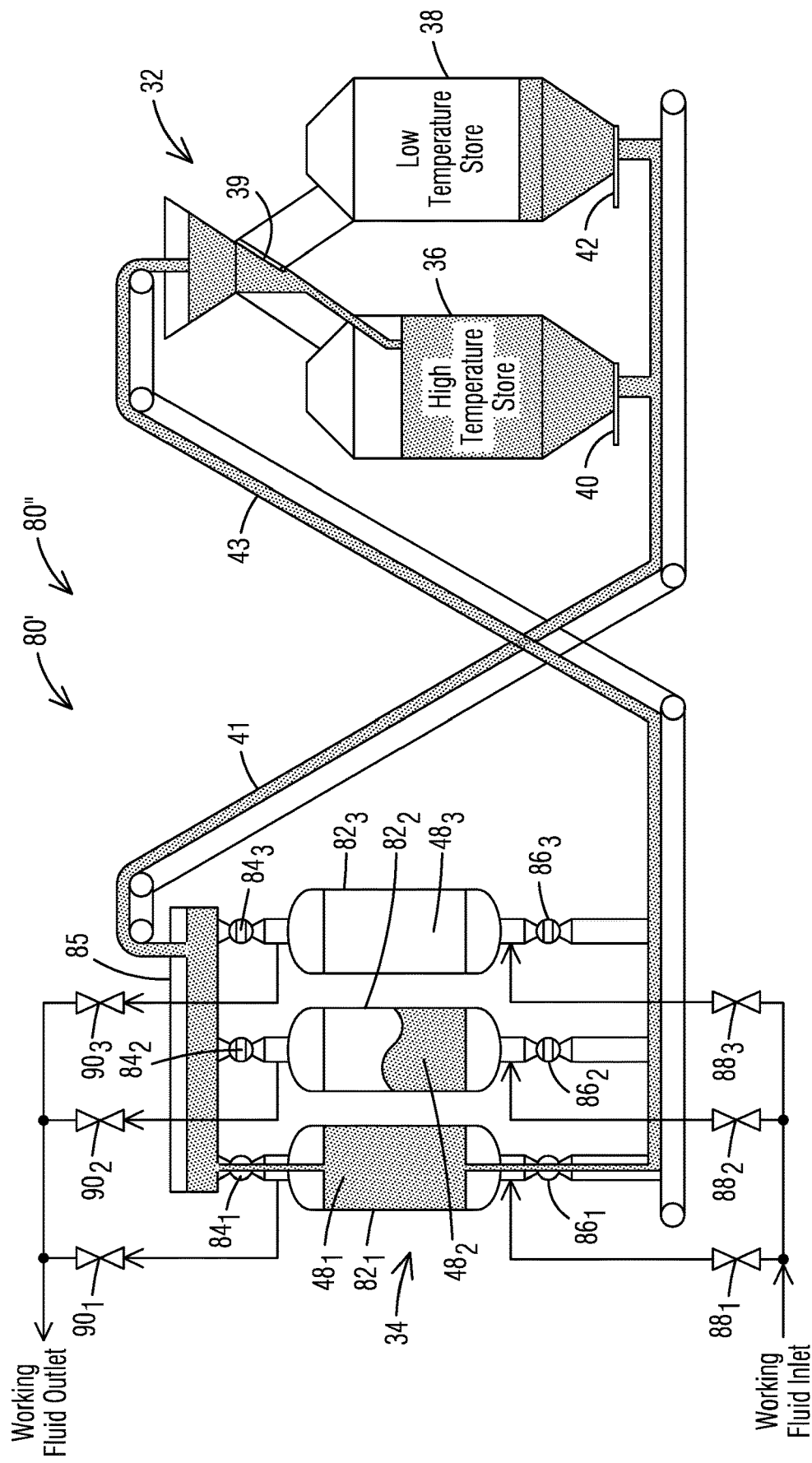
FIG. 7 is a schematic of yet another non-limiting embodiment of a disclosed apparatus involving a cyclical feeder assembly for implementing the direct thermal coupling between the conveyable solid thermal storage media and the working fluid in a disclosed PHES system.

FIG. 7 is a schematic of structural details of an apparatus 80' that may constitute another non-limiting embodiment of cold heat exchange storage apparatus 14 (FIG. 1). Similarly, apparatus 80" (same as apparatus 80') may constitute another non-limiting embodiment of hot heat exchange storage apparatus 16. Accordingly, to spare the reader from burdensome redundancies, the description of apparatuses 80' and 80" will not be repeated twice. Without limitation, apparatus 80' (and 80") involves a cyclical feeder assembly for implementing the direct thermal coupling between the conveyable bulk solid thermal storage media and the working fluid in a disclosed PHES system. In this embodiment, heat exchanger assembly 34 may be made up of a plurality of heat exchanger vessels 82.

In one non-limiting embodiment, the cyclical feeder assembly involved in apparatus 80' (and 80") may include a first arrangement of solid thermal storage media inlet valves 84 disposed at or proximate the top end of the plurality of heat exchanger vessels 82 and may further include a second arrangement of solid thermal storage media outlet valves 86 disposed at or proximate the bottom end of the plurality of heat exchanger vessels.

In one non-limiting embodiment, the cyclical feeder assembly involved in apparatus 80' (and 80") may include a first arrangement of working fluid inlet valves 88 and a second arrangement of working fluid outlet valves 90 operable to selectively allow passage of working fluid through respective ones of the heat exchanger vessels. A non-limiting description of structural and/or operational interrelationships of the valving arrangements is provided below.

Figure 8:
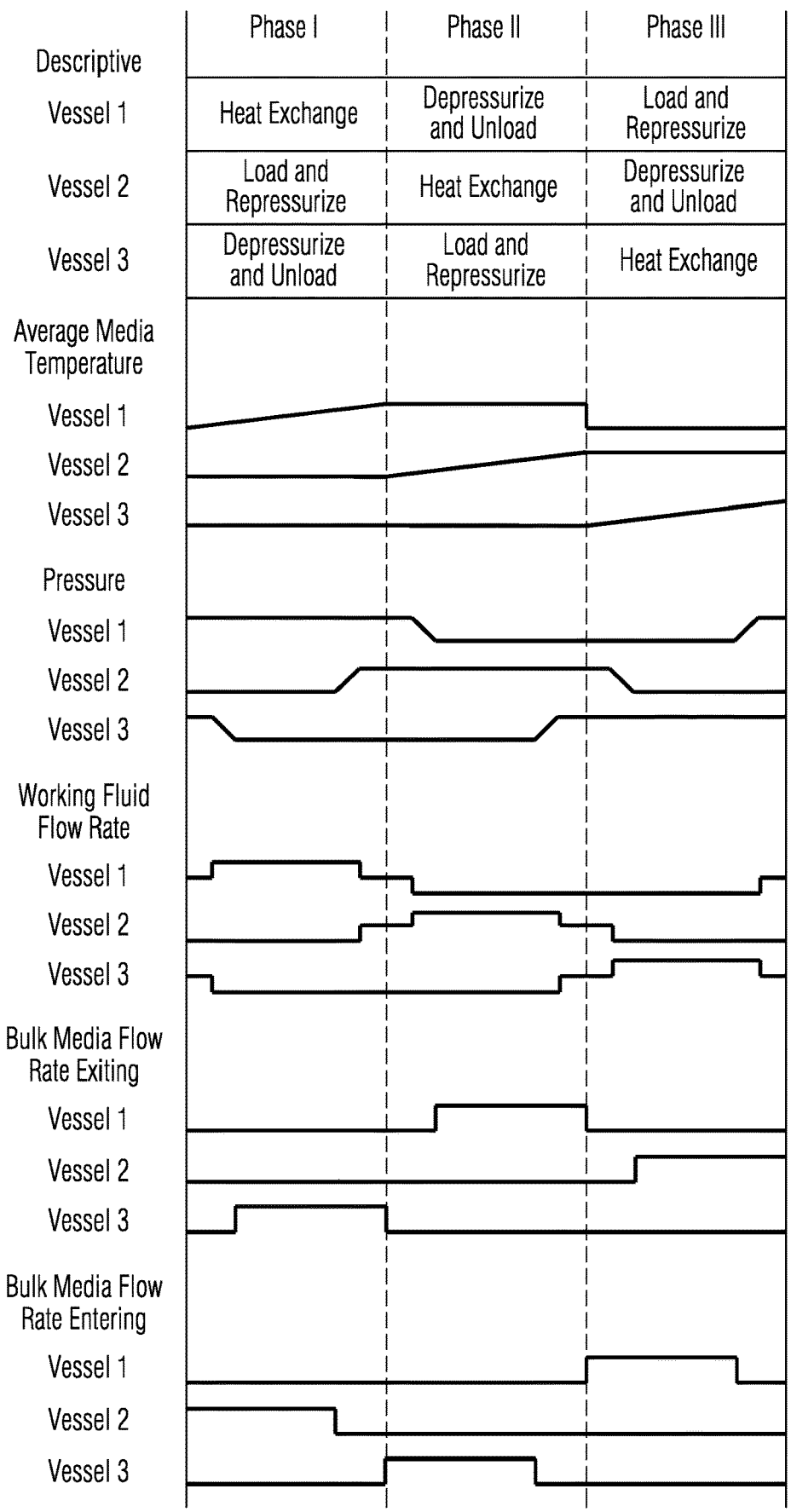
FIG. 8 is a flow diagram of various non-limiting examples of parameters in connection with illustrative phases of the disclosed cyclical feeder assembly shown in FIG. 7.

FIG. 8 is a flow diagram of various non-limiting examples of parameters in connection with illustrative operational phases of the disclosed cyclical feeder assembly shown in FIG. 7. As illustrated in FIG. 8, phase I corresponds to a situation when heat exchanger vessel $82_1$ experiences heat exchange in heat exchanger assembly 34. That is, working fluid inlet valve $88_1$ and working fluid outlet valve $90_1$ are set to an open condition so that working fluid flows through the pressurized chamber of heat exchanger vessel $82_1$ to establish direct thermal coupling with the batch of conveyable solid thermal storage media currently occupying the pressurized chamber $48_1$ of heat exchanger vessel $82_1$.

As further illustrated in FIG. 8, during phase I, the pressurized chamber $48_2$ of heat exchanger vessel $82_2$ may be filled with solid thermal storage media. That is, solid thermal storage media inlet valve $84_2$ is set to an open condition so that the feeder assembly fills with a batch of the conveyable solid thermal storage media the pressurized chamber $48_2$ of heat exchanger vessel $82_2$ Lastly, during Phase I, solid thermal storage media outlet valve $86_3$ may be set to an open condition so that the pressurized chamber $84_3$ of heat exchanger vessel $82_3$ is emptied to return conveyable solid thermal storage media to thermal storage assembly 32.

By way of example, FIG. 7 may illustrate aspects of the foregoing Phase I. Heat exchanger vessel $82_1$ is fully loaded while working fluid flows through the pressurized chamber of heat exchanger vessel $82_1$ to establish direct thermal coupling with the batch of conveyable solid thermal storage media currently occupying the pressurized chamber $48_1$ of heat exchanger vessel $82_1$ The pressurized chamber $48_2$ of heat exchanger vessel $82_2$ may be in the process of being filled with solid thermal storage media while heat exchanger vessel $82_3$ may have been emptied to return conveyable solid thermal storage media to thermal storage assembly 32.

As illustrated in FIG. 8, phase II corresponds to a situation when heat exchanger vessel $82_2$ experiences heat exchange in heat exchanger assembly 34. That is, working fluid inlet valve $88_2$ and working fluid outlet valve $90_2$ are set to an open condition so that working fluid flows through the pressurized chamber of heat exchanger vessel $82_2$ to establish direct thermal coupling with the batch of conveyable solid thermal storage media currently occupying the pressurized chamber $48_2$ of heat exchanger vessel $82_2$.

As further illustrated in FIG. 8, during phase II, the pressurized chamber $48_3$ of heat exchanger vessel $82_3$ may be filled with solid thermal storage media. That is, solid thermal storage media inlet valve $84_3$ is set to an open condition so that the feeder assembly fills with a batch of the conveyable solid thermal storage media the pressurized chamber $48_3$ of heat exchanger vessel $82_3$ Lastly, during Phase II, solid thermal storage media outlet valve $86_1$ may be set to an open condition so that the pressurized chamber $84_1$ of heat exchanger vessel $82_1$ is emptied to return conveyable solid thermal storage media to thermal storage assembly 32.

As illustrated in FIG. 8, phase III corresponds to a situation when heat exchanger vessel $82_3$ experiences heat exchange in heat exchanger assembly 34. That is, working fluid inlet valve $88_3$ and working fluid outlet valve $90_3$ are set to an open condition so that working fluid flows through the pressurized chamber of heat exchanger vessel $82_3$ to establish direct thermal coupling with the batch of conveyable solid thermal storage media currently occupying the pressurized chamber $48_3$ of heat exchanger vessel $82_3$.

As further illustrated in FIG. 8, during Phase III, the pressurized chamber $48_1$ of heat exchanger vessel $82_1$ may be filled with solid thermal storage media. That is, solid thermal storage media inlet valve $84_1$ is set to an open condition so that the feeder assembly fills with a batch of the conveyable solid thermal storage media the pressurized chamber $48_1$ of heat exchanger vessel $82_1$. Lastly, during Phase III, solid thermal storage media outlet valve $86_2$ may be set to an open condition so that the pressurized chamber $84_2$ of heat exchanger vessel $82_2$ is emptied to return conveyable solid thermal storage media to thermal storage assembly 32. The foregoing actions may be cyclically repeated by disclosed cyclical feeder assembly 80 (FIG. 7).

Although the cyclical feeder assembly described in the context of FIGS. 7 and 8 involves three heat exchanger vessels, it should be appreciated that this feature should be construed in an example sense and not in a limiting sense. For example, the number of heat exchanger vessels could be as small as two, and conceptually there is no upper limit to how many heat exchanger vessels could be used. The choice of the number of heat exchanger vessels can be arranged based on the needs and/or tradeoffs that may be involved in a given application.

For instance, the fewer heat exchanger vessels are used, then actions (other than heat exchange) such as depressurize, unload, load, re-pressurize should be performed relatively quicker compared to embodiments involving a larger number of heat exchanger vessels.

Additionally, in embodiments involving relatively fewer heat exchanger vessels, then this would involve relatively fewer media handling valves albeit of relatively larger size since such valves would be expected to load and unload the system relatively quickly and undergo a substantial number of operating cycles. Lastly, embodiments involving relatively fewer heat exchanger vessels, would entail a relatively large buffer at the inlet and discharge of the heat exchanger vessels.

Conversely, in embodiments involving a relatively larger number of heat exchanger vessels then this would involve more media handling valves of a relatively smaller size since in these embodiments since such valves would be expected to load and unload the system during longer time intervals and undergo a lesser number of operating cycles. Lastly, embodiments involving relatively more heat exchanger vessels, would entail a relatively smaller buffer at the inlet and discharge of the heat exchanger vessels.

The foregoing process may be cyclically repeated with additional heat exchanger vessels 82 of heat exchanger assembly 34 so that the conveyable bulk solid thermal storage media is cyclically circulated (e.g., discrete transfers of batches of the solid media in lieu of continuous circulation) between heat exchanger assembly 34 and thermal storage assembly 32.

Alternative Non-Limiting Embodiments

In one non-limiting embodiment, charging assembly (11') may include an electric motor (18) to convert electrical energy to mechanical energy; a compressor (10) which raises the pressure of a working fluid, thereby raising the temperature of the fluid while consuming mechanical energy; a high-temperature heat exchange apparatus (16) that transfers heat from the working fluid to a thermally massive substance (e.g., a conveyable solid media) in the high-temperature heat exchange apparatus (16); an expander (12) which reduces the pressure of the working fluid to substantially the same pressure as the inlet of the compressor (10), thereby reducing the temperature of the fluid and producing mechanical energy in an amount less than what was consumed by the compressor, such that the combination of the compressor (10) and expander (12) requires a net input of energy; and a low temperature heat exchange apparatus (14) that transfers heat to the working fluid from a thermally massive substance (e.g., conveyable solid media) in the low temperature heat exchange apparatus (14), such that at the conclusion of this process the working fluid is at ideally the same temperature and pressure as at the inlet of the compressor (10) such that the working fluid can be reintroduced to the compressor (10) inlet forming a closed-loop system.

In one non-limiting embodiment, and continuing from the preceding paragraph, discharging assembly (11") may include a compressor (20), which raises the pressure of the working fluid, thereby raising the temperature of the fluid while consuming mechanical energy; a high-temperature heat exchange apparatus (16) that transfers heat from the thermally massive substance (e.g., conveyable solid media) in the high-temperature heat exchange apparatus (14), thereby returning this substance to its original temperature; an expander (22) which reduces the pressure of the working fluid to substantially the same pressure as the inlet of the compressor (20), thereby reducing the temperature of the fluid and producing mechanical energy in an amount in excess of what was consumed by the compressor, such that the combination of the compressor (20) and expander (22) produces a net output of energy; and where the low-temperature heat exchange apparatus (14) transfers heat from the working fluid to the thermally massive substance (e.g., conveyable solid media) in the low temperature heat exchange apparatus (14), thereby returning this substance to its original temperature, such that at the conclusion of this process the working fluid is at ideally the same temperature and pressure as at the inlet of the compressor (20) such that the working fluid can be reintroduced to the compressor (20) inlet forming the closed-loop system.

In one non-limiting embodiment, and continuing from the preceding paragraph, one and one or both of the hot and cold heat exchange and storage assemblies (16) and (14) may include a low temperature store (38) which operates at substantially atmospheric pressure and can contain sufficient quantity of the conveyable solid media so as to facilitate a desired rate and duration of energy absorption or delivery by the pumped heat energy storage system (11); a high temperature store (36) which operates at substantially atmospheric pressure and can contain substantially the same quantity of material as the low temperature store (38).

In one non-limiting embodiment, and continuing from the preceding paragraph, the one and one or both of the hot and cold heat exchange and storage assemblies (16) and (14) may further include a control valve (42) which can drain the low temperature store at a requisite rate corresponding to the rate of energy absorption or delivery by pumped heat energy storage system (11); a control valve (40) which can drain the high temperature store at a requisite rate corresponding to the rate of energy absorption or delivery by pumped heat energy storage system (11); a feeder system which may deliver the conveyable solid media from either the low temperature store (38) or the high temperature store (36) to an elevation above the direct contact heat exchange vessel (34); an airlock feeder (40) which feeds the conveyable solid media from substantially atmospheric pressure into the direct contact heat exchanger (34), which operates at the pressure of the cycle working fluid, while minimizing the leakage of the pressurized working fluid towards the atmosphere; a direct contact heat exchanger (34) whereby the conveyable solid media is directly exposed to the working fluid, thus permitting effective heat transfer between the two. An efficient counter-current heat exchange process may be realized by directing the working fluid upward in the exchanger while the solid media flows downward; an airlock feeder (50) which feeds the conveyable solid out from the direct contact heat exchanger (34), from substantially the pressure of the cycle working fluid back to atmospheric pressure, while minimizing the leakage of the pressurized working fluid towards the atmosphere.

In one non-limiting embodiment, and continuing from the preceding paragraph, the one and one or both of the hot and cold heat exchange and storage assemblies (16) and (14) may further include a return feeder system which delivers the conveyable solid media from the outlet of airlock feeder (50) to a higher elevation than that of the top of either the low or high temperature stores, respectively (38) or (36). A diverter valve system (39) which is able to selectively deliver the conveyable solid media to either the low or high temperature store, respectively (38) or (36).

In one non-limiting embodiment, and continuing from the preceding paragraph, the hot heat exchange and storage assembly (16) can selectively operate in charging mode by transferring conveyable solid media from the low temperature store (38) though the direct contact heat exchanger (34) and returning this media to the high temperature store (36). The hot heat exchange and storage assembly (16) can further selectively operate in a discharging mode by transferring conveyable solid media from the high temperature store (36) through the direct contact heat exchanger (34) to returning this media to the high temperature store (38).

In one non-limiting embodiment, and continuing from the preceding paragraph, the cold heat exchange and storage assembly (14) selectively operate in charging mode by transferring conveyable solid media from the high temperature store (36) through the direct contact heat exchanger (34) to return this media to the low temperature store (38). The cold heat exchange and storage assembly (14) can further selectively operate in a discharging mode by transferring conveyable solid media from the low temperature store (38) through the direct contact heat exchanger (34) to return this media to the high temperature store (36).

Effect of Recuperation

Figure 9:
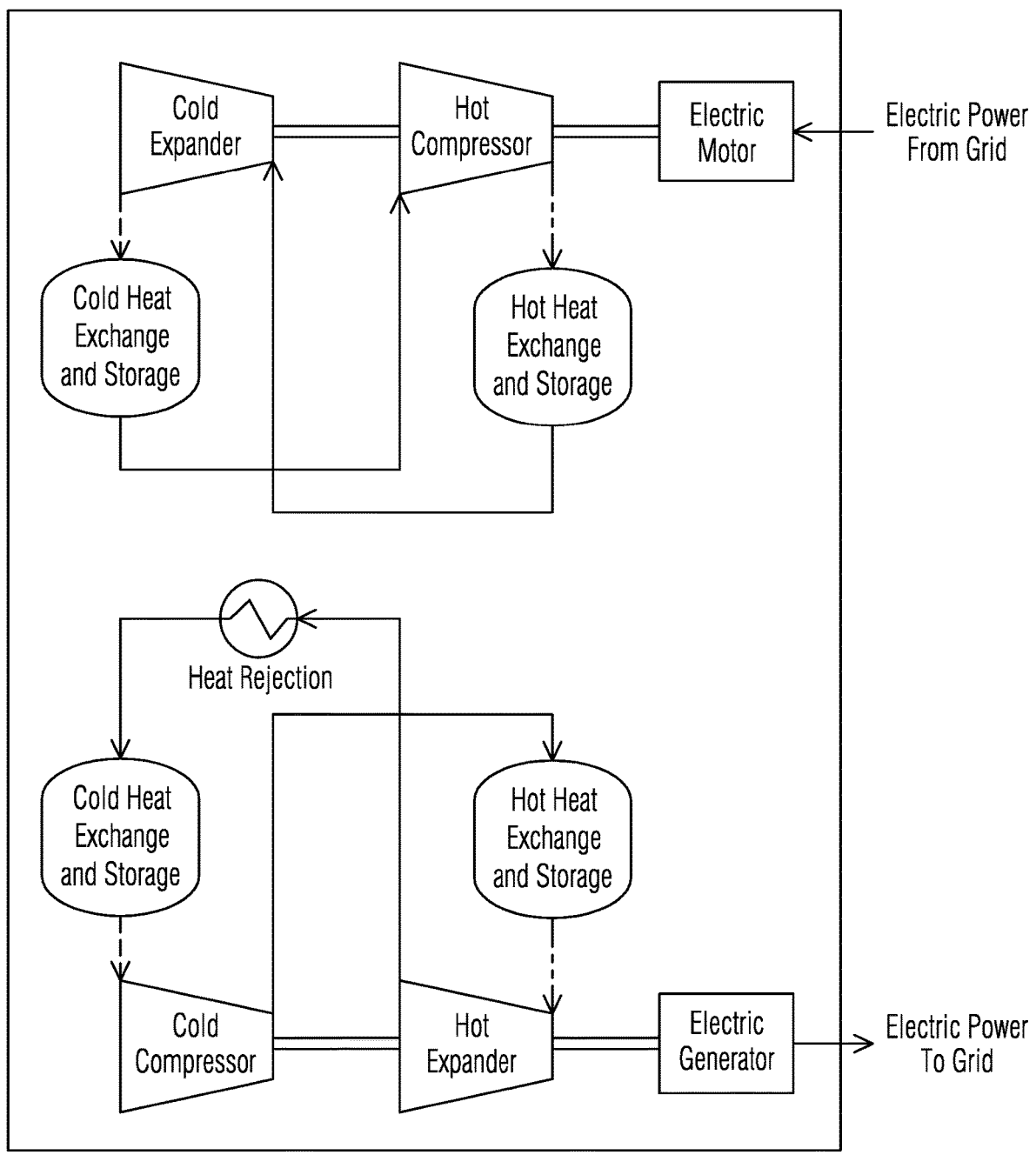
FIG. 9 is a flow diagram of an idealized non-recuperated cycle as may be alternatively used in a disclosed PHES system involving conveyable solid thermal storage media directly thermally coupled to the working fluid.

A basic PHES cycle without recuperation (i.e., non-recuperated cycle) as may be alternatively used in a disclosed PHES system is shown in FIG. 9. The main distinction of the non-recuperated cycle is the fact that the hot machine experiences the complete temperature range between the limiting cycle peak temperature and the ambient temperature. The temperature range of the cold machine may then be established by the isentropic process over the same pressure ratio, having maximum temperature at the ambient.

Figure 10:
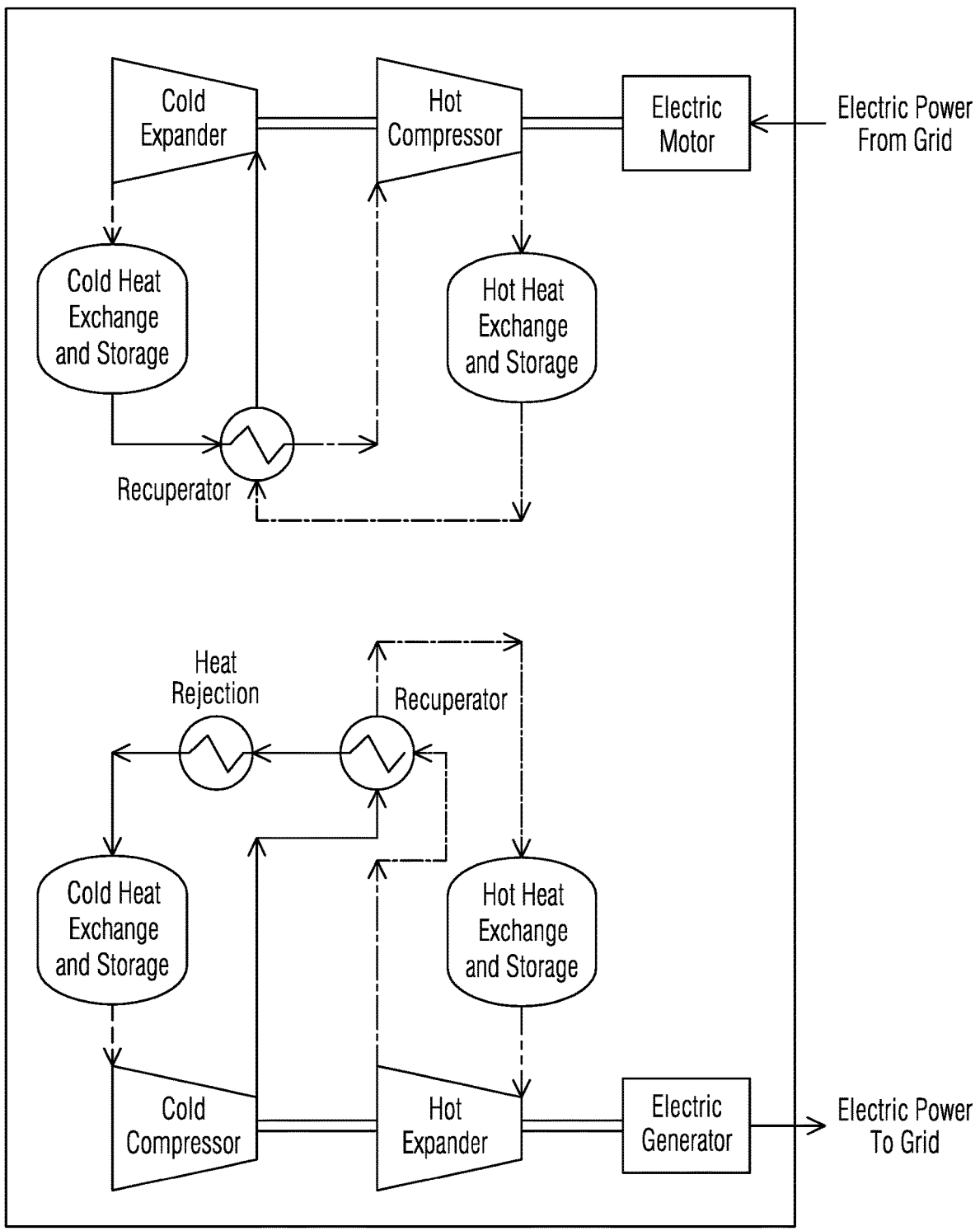
FIG. 10 is a flow diagram of an idealized non-recuperated cycle as may be alternatively used in a disclosed PHES system involving conveyable solid thermal storage media directly thermally coupled to the working fluid.

A cycle with recuperation (i.e., recuperated cycle) as may be alternatively used in a disclosed PHES system is shown in FIG. 10. The effect of recuperation is that the temperature range of the hot machine is reduced, having its maximum temperature still at the limiting cycle peak temperature, but with the lower temperature of the hot machine at a rather discretionary point between the ambient and peak temperatures.

Without limitation, the effect of this discretionary "warm" temperature on the cycle performance may be as follows:

With increasing warm temperature, the pressure ratio of the cycle decreases.

With consistent assumptions regarding pressure drops and turbomachinery efficiencies, the overall roundtrip efficiency reaches some maximum value with the optimal selection of the warm temperature.

With increasing warm temperature, the thermal mass (i.e. size) of the thermal stores increases, since roughly the same quantity of thermal energy moves into and out of storage, while the temperature range of the store decreases.

The volume flow for the turbomachinery does not appear to increase with recuperation, presuming a constant limiting high-side pressure. The importance of volume flow is that this parameter—relatively more compared to other parameters—impacts the size and cost of equipment and piping. The cycle mass flow increases with higher warm temperature since, as with the stores, the same amount of energy should be extracted over a narrower temperature range, however, the effect on the volume flow at the low side of the cycle is offset, since low-side pressure is simultaneously increasing. Note that the increase in low-side pressure follows from the decrease in cycle pressure ratio with higher warm temperature, thus if the high-side pressure is held approximately constant, low side pressure increases with reduced ratio.

It should be appreciated that in the limiting case where the warm temperature approaches the ambient, the recuperator duty reduces to practically nil and one returns essentially to the basic cycle. The recuperated cycle generally demonstrates an optimal roundtrip efficiency value with a warm temperature significantly above the ambient, so it seems that selecting the non-recuperated cycle implies sacrificing efficiency for the sake of reducing thermal store size.

In most practical embodiments of PHES, the cost of the energy conversion equipment (e.g., turbomachinery, heat exchangers, piping, etc.) should be expected to out-weight the cost of the stores. Also the lower pressure ratio of recuperated cycle embodiments may be favorable with regard to charging and discharging rate control by way of inventory management, so it appears that the recuperated cycle has several advantages over the non-recuperated basic cycle variant.

The Overlap Cycle

As noted above, the recuperated cycle demonstrates that by reducing the temperature range of the machines, the pressure ratio is correspondingly reduced, resulting in further benefits to the system. In the recuperated cycle, the temperature range of the turbomachines is reduced by virtue of the recuperator—a physical heat exchanger transferring energy between the high-pressure and low-pressure working fluid. It is also possible to achieve a similar thermodynamic effect of recuperation by operating the stores over a wider temperature range, specifically in such a way that there is an overlap between the temperature range of the hot and cold stores.

The feasibility of the overlapped cycle depends primarily on the choice of the store concept and available thermal media. The overlap cycle involves a larger operable temperature range for the media, which can be challenging. For example, molten salt, which in certain applications may be a candidate for the hot media, generally has a freezing point above the ambient, so that the overlap cycle would not be applied with this choice of media. Accordingly, one non-limiting choice for the overlap cycle variant would be solid phase media.

It will be appreciated that although the overlap cycle changes the operable temperature range of the media, this does not dictate more or less media quantity for a specific energy storage capacity as compared to the recuperated cycle.

In operation, disclosed embodiments provide a PHES system involving conveyable bulk solid thermal storage media, which is directly thermally coupled to the working fluid in a cost-effective and reliable manner. Without limitation, disclosed embodiments can make use of immersed-particle heat exchanger technology (this type of exchangers may also be referred to in the art as falling-bed heat exchangers) and can offer similar roundtrip efficiency and pressure ratio characteristics as achievable in a recuperated cycle without involving a recuperator and concomitant piping. That is, disclosed embodiments can be arranged to operate in an overlapped cycle.

While embodiments of the present disclosure have been disclosed in exemplary forms, it will be apparent to those skilled in the art that many modifications, additions, and deletions can be made therein without departing from the scope of the invention and its equivalents, as set forth in the following claims.

What is claimed is:

1. A pumped heat energy storage system comprising:
a charging assembly configured to implement a thermodynamic heat pump cycle that consumes electrical energy from an electrical grid to raise and lower temperature of conveyable, solid thermal storage media respectively in a hot heat exchange and storage apparatus and in a cold heat-exchange and storage apparatus; and
a discharging assembly configured to implement a thermodynamic engine cycle to lower and raise the temperature of the conveyable, solid material respectively in the hot heat exchange and storage apparatus and in the cold heat exchange and storage apparatus, while extracting work, thereby returning to the electrical grid at least a portion of the electrical energy consumed by the charging assembly, and further configured to concurrently return the conveyable, solid thermal storage media in the hot heat exchange and storage apparatus and in the cold heat exchange and storage apparatus to respective initial temperatures of the conveyable, solid thermal storage media therein,
wherein the hot heat exchange and storage apparatus comprises:
a thermal storage assembly including a low temperature store arranged to operate at substantially atmospheric pressure and accommodate a sufficient quantity of the conveyable, solid thermal storage media to facilitate a desired rate and duration of energy absorption or delivery by the pumped heat energy storage system, and further including a high temperature store arranged to operate at substantially atmospheric pressure and accommodate substantially the same quantity of the conveyable, solid thermal storage media as the low temperature store;
a heat exchanger assembly arranged to directly thermally couple the conveyable, solid thermal storage media that is conveyed to the heat exchanger assembly from the low temperature store or from the high temperature store associated with the hot heat exchange and storage apparatus with a flow of working fluid that passes through the heat exchanger assembly; and
a feeder assembly arranged to circulate the conveyable, solid thermal storage media between the low temperature store and the high temperature store associated with hot heat exchange and storage apparatus.

2. A pumped heat energy storage system comprising:
a charging assembly configured to implement a thermodynamic heat pump cycle that consumes electrical energy from an electrical gird to raise and lower temperature of conveyable, solid thermal storage media respectively in a hot heat exchange and storage apparatus and in a cold heat-exchange and storage apparatus; and
a discharging assembly configured to implement a thermodynamic engine cycle to lower and raise the temperature of the conveyable, solid material respectively in the hot heat exchange and storage apparatus and in the cold heat exchange and storage apparatus, while extracting work, thereby returning to the electrical gird at least a portion of the electrical energy consumed by the charging assembly, and further configured to concurrently return the conveyable, solid thermal storage media in the hot heat exchange and storage apparatus and in the cold heat exchange and storage apparatus to respective initial temperatures of the conveyable, solid thermal solid media therein,
wherein the cold heat exchange and storage apparatus comprises:
a thermal storage assembly including a low temperature store arranged to operate at substantially atmospheric pressure and accommodate a sufficient quantity of the conveyable, solid thermal storage media to facilitate a desired rate and duration of energy absorption or delivery by the pumped heat energy storage system, the thermal storage assembly further including a high temperature store arranged to operate at substantially atmospheric pressure to accommodate substantially the same quantity of material as the low temperature store;
a heat exchanger assembly arranged to directly thermally couple the conveyable, solid thermal storage media that is conveyed to the heat exchanger assembly from the low temperature store or from the high temperature store associated with the cold heat exchange and storage apparatus with a flow of the working fluid that passes through the heat exchanger assembly; and a feeder assembly arranged to circulate the conveyable, solid thermal storage media between the low temperature store and the high temperature store associated with the cold heat exchange and storage apparatus.

3. The pumped heat energy storage system of claim 2, wherein the conveyable solid thermal storage media comprises conveyable bulk solid thermal storage media,
wherein the feeder assembly comprises a first rotary airlock disposed at or proximate a top end of the heat exchanger assembly, the first rotary airlock connected to a bulk solid thermal storage media inlet arranged to pass conveyable bulk solid thermal storage media to a pressurized chamber of the heat exchanger assembly from the thermal storage assembly at atmospheric pressure.

4. The pumped heat energy storage system of claim 3, wherein the feeder assembly further comprises a second rotary airlock disposed at or proximate a bottom end of the heat exchanger assembly, the second rotary airlock connected to a bulk solid thermal storage media outlet arranged to transfer from the pressurized chamber of the heat exchanger assembly to the thermal storage assembly at atmospheric pressure the bulk solid thermal storage media passed to the heat exchanger assembly.

5. The pumped heat energy storage system of claim 3, wherein the heat exchanger assembly is connected to a working fluid inlet disposed at or proximate the bottom end of the heat exchanger assembly, and is further connected to a working fluid outlet disposed at or proximate the top end of the heat exchanger assembly so that the working fluid flows upwardly between the working fluid inlet and the working fluid outlet to establish a direct thermal coupling with the conveyable bulk solid thermal storage media that falls downwardly into the pressurized chamber of the heat exchanger assembly between the bulk solid thermal storage media inlet and the bulk solid thermal storage media outlet.

6. The pumped heat energy storage system of claim 3, wherein the heat exchanger assembly comprises a valve assembly arranged downstream from and proximate the bulk solid thermal storage media inlet to control a mass flow rate of the conveyable bulk solid thermal storage media passed to the pressurized chamber of the heat exchanger assembly.

7. The pumped heat energy storage system of claim 3, wherein the first rotary airlock and the second rotary airlock are arranged to operate as continuous rotary airlocks so that the feeder assembly in operation continually circulates the conveyable bulk solid thermal storage media between the thermal storage assembly and the heat exchanger assembly.

8. The pumped heat energy storage system of claim 2, wherein the conveyable solid thermal storage media comprises conveyable bulk solid thermal storage media,
wherein the feeder assembly comprises a rotary airlock connected to a first bulk solid thermal storage media inlet (I) coupled to a first operating stage of the rotary airlock fillable with conveyable bulk solid thermal storage media received from the thermal storage assembly at atmospheric pressure, the rotary airlock further including a first bulk solid thermal storage media outlet (II) arranged to supply to a pressurized chamber of the heat exchanger assembly conveyable bulk solid thermal storage media from the first operating stage of the rotary airlock.

9. The pumped heat energy storage system of claim 8, wherein the rotary airlock is further connected to a second bulk solid thermal storage media outlet (IV) arranged to return to the thermal storage assembly at atmospheric pressure conveyable bulk solid thermal storage media from a second operating stage of the rotary airlock fillable with conveyable bulk solid thermal storage media received from the pressurized chamber of the heat exchanger assembly by way of a second bulk solid thermal storage media inlet (III) connected to the second operating stage of the rotary airlock.

10. The pumped heat energy storage system of claim 9, further comprising a pressurized bulk solid thermal storage media elevator having a top end and a bottom end, the bottom end of the pressurized bulk solid thermal storage media elevator arranged to receive through a bottom region connector conveyable bulk solid thermal storage media from a bottom region of the pressurized chamber of the heat exchanger assembly, the top end of the pressurized bulk solid thermal storage media elevator arranged to convey to the second bulk solid thermal storage media inlet (III) conveyable bulk solid thermal storage media upwardly moved by the pressurized bulk solid thermal storage media elevator from the bottom end of the pressurized bulk solid thermal storage media elevator.

11. The pumped heat energy storage system of claim 10, wherein the heat exchanger assembly is connected to a working fluid inlet disposed at or proximate a bottom end of the heat exchanger assembly, and is further connected to a working fluid outlet disposed at or proximate a top end of the heat exchanger assembly so that the working fluid flows upwardly between the working fluid inlet and the working fluid outlet to establish a direct thermal coupling with conveyable bulk solid thermal storage media that falls downwardly into the pressurized chamber of the heat exchanger assembly between the first bulk solid thermal storage media outlet (II) and the bottom region of the pressurized chamber of the heat exchanger assembly.

12. The pumped heat energy storage system of claim 1,
wherein the heat exchanger assembly comprises a plurality of heat exchanger vessels, and
wherein the feeder assembly comprises a first arrangement of bulk solid thermal storage media inlet valves disposed at or proximate a top end of the plurality of heat exchanger vessels, and further comprises a second arrangement of bulk solid thermal storage media outlet valves disposed at or proximate a bottom end of the plurality of heat exchanger vessels.

13. The pumped heat energy storage system of claim 12, further comprising a first arrangement of working fluid inlet valves, and
a second arrangement of working fluid outlet valves operable to selectively allow passage of working fluid through a selected one of the heat exchanger vessels based on an operational phase of the feeder assembly.

14. The pumped heat energy storage system of claim 12, wherein the plurality of heat exchanger vessels is operatively coupled to the first arrangement of bulk solid thermal storage media inlet valves so that the feeder assembly fills with a batch of the conveyable bulk solid thermal storage media a respective pressurized chamber of a selected one of the plurality of heat exchanger vessels based on an operational phase of the feeder assembly.

15. The pumped heat energy storage system of claim 14, wherein the plurality of heat exchanger vessels is further operatively coupled to a first arrangement of working fluid inlet valves and to a second arrangement of working fluid outlet valves set to an open condition so that working fluid flows upwardly in the respective pressurized chamber of the selected one of the plurality of heat exchanger vessels filled with the conveyable bulk solid thermal storage media to establish a direct thermal coupling with the conveyable bulk solid thermal storage media therein.

16. The pumped heat energy storage system of claim 15, wherein the plurality of heat exchanger vessels is further operatively coupled to the second arrangement of bulk solid thermal storage media outlet valves so that, once the direct thermal coupling has been established and heat has been exchanged between the flow of working fluid and the conveyable bulk solid thermal storage media in the respective pressurized chamber, then the feeder assembly empties the respective pressurized chamber to return the batch of the conveyable bulk solid thermal storage media to the thermal storage assembly.

17. The pumped heat energy storage system of claim 1, wherein the conveyable solid thermal storage media comprises conveyable bulk solid thermal storage media,
wherein the conveyable bulk solid thermal storage media is selected from the group consisting of sand; bulk metal; bulk metal oxides, such as iron oxide and aluminum oxide, bulk ceramic, rock bulk material including rock bulk material of volcanic origin, such as basalt rock, diabase rock, granite rock and gneiss rock; ball bulk material and a combination of two or more of the foregoing bulk solid thermal storage media.

18. The pumped heat energy storage system of claim 17, wherein the ball bulk material comprises single-grain bulk material comprising spheroids of approximately the same diameter; multi-grain bulk material comprising spheroids of different diameters; or a mixture of single-grain bulk material and multi-grain bulk material.

19. The pumped heat energy storage system of claim 1, wherein the conveyable solid thermal storage media comprises conveyable bulk solid thermal storage media,
wherein the conveyable bulk solid thermal storage media is in the form of packed beds, such as spherical and/or irregularly shaped pebbles or gravel.

20. The pumped heat energy storage system of claim 1, configured to operate without a recuperator in an overlapped cycle, wherein at least a portion of respective operable temperature ranges of respective hot and cold stores of the thermal storage assembly overlap.

* * * * *

UNITED STATES PATENT AND TRADEMARK OFFICE
CERTIFICATE OF CORRECTION

PATENT NO. : 10,775,111 B2  
APPLICATION NO. : 16/204223  
DATED : September 15, 2020  
INVENTOR(S) : Jason M. Kerth Page 1 of 1

It is certified that error appears in the above-identified patent and that said Letters Patent is hereby corrected as shown below:

On the Title Page

At Item (54) and in the Specification, at Column 1, Line 1, please correct the title to show "CONVEY ABLE" as "CONVEYABLE".

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*